US006893474B2

United States Patent
Jäfverström et al.

(10) Patent No.: US 6,893,474 B2
(45) Date of Patent: May 17, 2005

(54) PURIFICATION PROCESS

(75) Inventors: Stefan Jäfverström, Södra Promenaden (SE); Neil Clarke, Warrington (GB)

(73) Assignee: Feralco AB, Helsingborg (SE)

( * ) Notice: Subject to any disclaimer, the term of this patent is extended or adjusted under 35 U.S.C. 154(b) by 310 days.

(21) Appl. No.: 10/164,111

(22) Filed: Jun. 5, 2002

(65) Prior Publication Data

US 2003/0041415 A1 Mar. 6, 2003

(30) Foreign Application Priority Data

Jun. 7, 2001 (SE) .............................. 0101995

(51) Int. Cl.⁷ ................................ B01D 9/02
(52) U.S. Cl. .................. 23/305 A; 23/295 R
(58) Field of Search ................ 23/297, 299, 305 A

(56) References Cited

U.S. PATENT DOCUMENTS 3,890,226 A * 6/1975 Hanami et al. ............. 210/705
5,558,847 A * 9/1996 Kaaber et al. .............. 423/111

FOREIGN PATENT DOCUMENTS

| GB | 497853 | 12/1938 |
| SE | 7903250-4 | 7/1981 |

* cited by examiner

Primary Examiner—Stanley S. Silverman
Assistant Examiner—Edward M. Johnson
(74) Attorney, Agent, or Firm—Gauthier & Connors LLP

(57) ABSTRACT

In a method of purifying an aluminium salt from a first aqueous aluminium salt solution of a raw material containing impurities, which comprise salts of at least one more noble metal than aluminium dissolved therein, a method of purifying a metal salt from inorganic impurities in an aqueous solution thereof is included. A plant for carrying out the method is also shown.

22 Claims, 1 Drawing Sheet

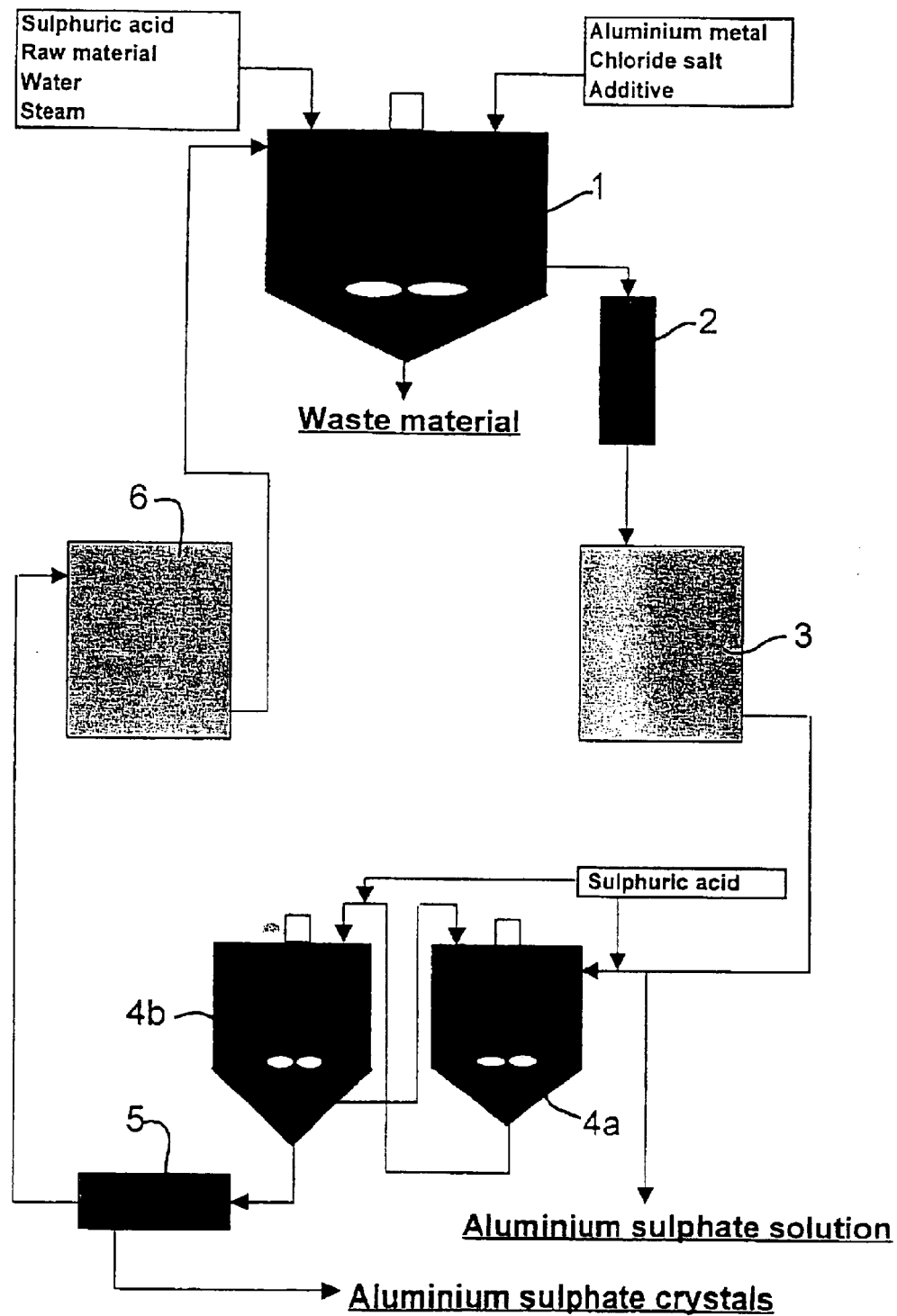

US 6,893,474 B2

PURIFICATION PROCESS

TECHNICAL FIELD

The invention relates to the purification of a metal salt from inorganic impurities. More precisely, the invention relates to a method of purifying a metal salt from inorganic impurities in an aqueous solution thereof, which method comprises purifying an aluminium salt from a first aqueous aluminium salt solution of a raw material containing impurities, which comprise salts of at least one more noble metal than aluminium dissolved therein.

Aluminium sulphate is a colourless salt that is produced by dissolving aluminium containing raw materials in sulfuric acid, for example by the action of sulfuric acid on hydrated aluminium oxide. The commercial form is a hydrated crystalline solid with the chemical formula $Al_2(SO_4)_3$. Aluminium sulphate combines with the sulphates of univalent metals to form hydrated double sulphates called alums, i.e. a group of hydrated double salts, usually consisting of aluminium sulphate, water of hydration, and the sulphate of another element.

Alums have has various industrial uses, such as a sizing agent for paper, a flocculating agent in water-purification plants, and a mordant (binder) in dyeing. Aluminium sulphate is also used extensively in paper manufacture as a binder for dyes and as surface filler. These industries produce large quantities of wastewater contaminated by aluminium.

Alums can easily be produced by means of precipitation from an aqueous solution. When for example potassium alum is produced, aluminium sulphate and potassium sulphate is dissolved in water, and then upon evaporation the alum crystallizes out of the solution. A more common production method is to treat hydrated aluminium oxide with sulfuric acid. The hydrated aluminium oxide is produced by digesting bauxite with caustic in the Bayer process, which is the most widely used production method.

Irrespective of the complicated nature of the Bayer process, the aluminium sulphate produced from hydrated aluminium oxide is quite pure and contains only small amounts of iron and silicon. The major impurity, residual soda, is present at levels of 0.2 to 0.6 percent. Purified aluminium sulphate usually contains 0.5 to 1 percent water, 0.3 to 0.5 percent soda, and less than 0.1 percent other oxides.

However, bauxite contains a number of impurities, including iron oxide and silica. If these impurities are not properly removed, they will pollute the industrial waste.

Apart from requiring high capital and operation costs, the Bayer process represents an increase in the total costs when bauxite or other aluminium ores are used. Such raw materials can be clay and industrial by-products. When bauxite or clay is used, silicate compounds must be removed by means of sedimentation and/or filtration, a procedure that further increases the production costs. Furthermore, if a solid product is desired, an evaporation step as well as a crystallization step is required, which also complicates the processing and increases the costs.

The further processing and use of aluminium, such as electroplating, also produces polluted waste streams. Spent aluminium catalysts are obtained as aluminium hydroxide and aluminium chloride from the oil cracking industry. In the aluminium finishing industry by-products are likewise obtained from the surface treatment of aluminium. For example, a sludge mainly of aluminium hydroxide, waste sulphuric acid from the removal of the coating in the surface treatment, and an aqueous sulphuric acid solution containing aluminium sulphate from recovery of sulphuric acid in the surface treatment is obtained.

Sulphuric acid is also used as a desiccating medium in order to dry gases, such as chlorine, diluted sulphuric acid being obtained as a waste product.

Thus, the disposal of metal-finishing wastes and toxic sludges is a major environmental problem and a polluted aluminium salt solution has up to now never been considered as a potential source of raw material since it has a negative economical value. Furthermore, a robust process is required without high investment costs, whereby aluminium sulphate can be produced directly from aluminium containing ores or from aluminium waste side streams.

In JP 04040201 the production of crystalline aluminium sulphate is accomplished by mixing aluminium sulphate with sulphuric acid and/or hydrochloric acid and concentrating almost to saturation. The solubility of the aluminium sulphate crystals at different temperatures is utilized by the mixture being transferred from a first crystallizer to a second crystallizer having a lower temperature than that of the first crystallization vessel in order to crystallize the aluminium sulphate.

In JP 01153517 sulphuric acid is added to an aluminium containing hydrochloric acid waste, whereby a 3/2-9/2 molar ratio of sulphate to aluminium is provided. The resultant mixed acid solution is then concentrated under reduced pressure, water being evaporated at a high temperature. Aluminium sulphate crystals are then precipitated by cooling the supersaturated solution to ambient temperature.

Likewise, in for example JP 49052798 and JP 74029821, crystals of aluminium sulphate are obtained by cooling a high temperature solution of aluminium sulphate and sulphuric acid.

According to the state of the art one of two different reactions is thus usually performed in order to crystallize a salt. The first one is removal of solvent. In this connection water is the solvent that in most cases has to be removed, for example by means of evaporation until the remaining solution becomes supersaturated. At this point, the salt is forced to crystallize. Alternatively, a saturated solution of a certain temperature is cooled to a lower temperature. This results in that the solution at the lower temperature becomes supersaturated, the salt being crystallized.

It is therefore an object of the present invention to provide a method of purifying a metal salt from inorganic impurities in an aqueous solution thereof.

Another object of the present invention is to simplify the production of aluminium sulphate from aluminium containing ore materials.

Yet another purpose is to produce aluminium sulphate from other raw materials than aluminium hydroxide, which is normal production method, raw materials of low quality being reprocessed to a product of a quality as high as possible.

A further object of the present invention is to provide a simple process, whereby pure aluminium sulphate is obtained as a solid material.

Still yet, another object is to provide a method of producing aluminium sulphate from mined raw materials and aluminium containing waste streams, whereby aluminium sulphate can be obtained with a varying degree of purity.

Yet an additional object of the present invention is to make use of residual sulphuric acid of different origin, which is not concentrated. Although pure, this sulphuric acid has no significant use in the industry and is thus without any value.

The above objects are achieved by the methods according to the appended independent claims.

Other objects, features and advantages of the present invention will appear from the following detailed disclosure, including examples, from the drawing as well as from the dependent claims.

Two main principles are utilized in all reprocessing and purification plants:
removal of the desired material from impurities,
removal of impurities from the desired material.

According to the invention, these two principles are illustrated by two reactions:
1. Crystallization reaction.
2. Reduction reaction.

Both reactions can be utilized separately or in combination. The reduction reaction can take place before the crystallization reaction. Alternatively, the inventive method comprises only a reduction reaction, the crystallization reaction being excluded.

In the crystallization reaction, the invention is based on the fact that some metal salts are more sparingly soluble than other metal salts in some solvents. This means that when such a solvent is obtained with a solution containing the metal salt as well as impurities, the metal salt will precipitate as crystals which can be recovered.

A salt is according to the invention crystallized from a supersaturated solution. However, the supersaturated condition of the solution is obtained in quite another way than that according to the state of the art.

According to the invention, a more easily soluble inorganic component is added to a saturated or non-saturated-aqueous solution of a metal salt, the metal salt being the material of interest to be processed. By adding a more easily soluble component, the more sparingly soluble salt of the desired metal is displaced from the solution. Thus, by adding a further component to the system, which has a higher solubility than the salt of the desired metal, the amount of water in the system becomes totally unaffected. Accordingly, the inventive method differs from the method of removing the solvent.

The inventive method is applicable to saturated as well as non-saturated aqueous solutions of the desired metal salt.

This basic idea of displacing a desired metal salt with an inorganic component in order to obtain a pure product by means of crystallization has been further exploited in order to obtain pure metal salts from aqueous solutions contaminated by other metals. The desired metal salt can be an aluminium salt or a ferric salt. Preferably, the salt of the desired metal is aluminium chloride, aluminium sulphate, ferric chloride, or ferric sulphate.

By including a reduction reaction and/or a crystallization reaction in the inventive method, a larger number of raw materials of divergent qualities can be processed when the salt of the desired metal is aluminium sulphate. For example, the aluminium containing material to be treated can be an aluminium ore or an aluminium mineral, such as bauxite or kaolin, or a co-product or a polluted waste stream from the aluminium industry. Thus, the raw material can either be mined, since these raw materials are not enough pure to be directly further processed, or they can be aluminium containing waste streams of an initially low value.

In the inventive method, the more easily soluble component can be sulphuric acid. When for example the raw material is bauxite, i.e. hydrated aluminium oxide containing variable amounts of iron oxide, silica, etc., the sulphuric acid of the inventive method has been used for leaching the raw material.

Concentrated sulphuric acid (96–98%) can also be used. However, it is preferred that the sulphuric acid is diluted in order not to generate heat, which is an advantage when the crystallized metal salt is precipitated. Thus, the sulphuric acid used in the present invention is preferably a by-product sulphuric acid without any inherent value. Preferably, the sulphuric acid used has a concentration of at least 60%.

In a solution comprising an aluminium salt as well as a ferric salt the addition of sulphuric acid will up to a certain point, i.e. about 15% sulfuric acid, result in that aluminium sulphate only is precipitated from the supersaturated metal salt solution.

The aluminium sulphate is then crystallized. The crystallization process is preferably performed in a continuous two step procedure with recycling of aluminium sulphare crystals from a second step to a first step. In this way, the crystallization is guaranteed by a continues supply of nuclei of crystallization.

After the crystallization, the aluminium sulphate crystals are separated from the mixture. This is performed by means of filtration and/or centrifugation. In this way, pure aluminium sulphate is obtained.

The resulting mother liquor with residual sulphuric acid is preferably recycled. It is also preferred that contaminating impurities are removed from the desired metal salt by including a reduction reaction in the inventive method. The impurities present as soluble metal ions in the material to be treated are then reduced to metallic solids in the aqueous solution of the material to be processed.

The reduction reaction is performed according to known principles with a less noble metal than the impurities to be treated, the less noble metal preferably being the metal of the desired salt.

Two reactions are exemplified:

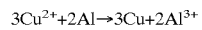

$$3Cu^{2+}+2Al\rightarrow 3Cu+2Al^{3+}$$

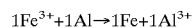

$$1Fe^{3+}+1Al\rightarrow 1Fe+1Al^{3+}$$

When the less noble and desired metal is aluminium the more noble impurities, such as iron, chromium, nickel, cobalt, copper, and manganese are reduced from their ionic form to their metallic form. However, ions of more toxic metals, such as zinc, lead, cadmium, mercury, vanadium, and nickel ions, can also be reduced according to the inventive method. These impurities can subsequently be removed in the form of metals.

When the less noble and desired metal is aluminium the amount of metallic aluminium required in order to accomplish the reduction reaction, of course, depends on the concentrations the more noble impurities as metal salts. The reaction time must also be taken into consideration, i.e. the longer reaction the more metallic aluminium is consumed. Furthermore, the higher oxidation state of the impurity, the more metallic aluminium is consumed in order to accomplish the reduction reaction. Theoretically, 1 mole of an impurity having a valence number of 3 requires 1 mole of aluminium, 1 mole of an impurity having a valence number of 2 requires ⅔ mole of aluminium, and 1 mole of an impurity having a valence number of 1 requires ⅓ mole of aluminium. Preferably, the double amounts of the theoretical values are used in order to guarantee a complete reduction reaction.

When the less noble and desired metal is aluminium, an oxide layer is often formed which prevents the reduction reaction. This is especially important when a reaction mixture contains sulphate ions, e.g. from sulphuric acid.

In order to initiate the reduction reaction, at least one chloride salt is according to the invention added as a catalyst. The chloride ions will then penetrate the protecting oxide layer of the metal and subsequently initiate one of the above-mentioned reactions.

Of course, the chloride salt added must not be a metal salt that is intended to be removed from the reaction mixture. On the other hand, it is preferred that the chloride salt added is a chloride salt of the desired metal, e.g. aluminium chloride.

Any cheap chloride can be used, such as sodium chloride, calcium chloride, or hydrochloric acid. A minimum concentration is required in order to initiate the reaction, which is about 1% as free chloride. Preferably, a certain surplus is added to the reaction mixture.

The removal of the reduced more noble metal together with other solid waste material can be performed by means of sedimentation and/or filtration. Preferably, an additive is added in order to facilitate the separation. The additive can be a polymeric additive, such as polyacrylamide, or activated carbon. Preferably, the additive is cationic polycarylamide.

In order to explain the invention in more detail an illustrative embodiment thereof will be described below reference being made to the accompanying drawing in which The Figure is a schematic flow diagram of a preferred embodiment of a plant for processing aluminum raw materials.

As shown in the Figure, the purification process starts in a reactor 1 charged with a raw material, e.g. bauxite, which is to be processed. The raw material is supplied to the reactor together with water, and eventually sulphuric acid. In this connection, a returning stream of acidic aluminium sulphate, if any, as well as the addition of raw material and any fresh sulphuric acid must be taken into consideration when producing the reaction mixture. Sulphuric acid is added in such an amount that the aluminium sulphate concentration in the reactor is about 8–8.5% $Al_2O_3$, which corresponds to a saturated solution at room temperature (25 C).

The reactor 1 of for example 5 $m^3$ is stirred in order to solubilize the contents, which is facilitated by supplying steam to the reactor. When the dissolution is complete, metallic aluminium is added to the mixture. If required, a chloride salt is also added in order to activate the metal, and the reduction reaction will commence as described above. The activated aluminium will then reduce ions of for example iron and heavy metals to their metallic form.

At the end of this reaction, an additive is added in order to facilitate the sedimentation of solid components as a waste material. The metals can then be separated from the reaction mixture together with other solid impurities originating from the raw material. The stirring is thus stopped and the waste material is drained from the reactor 1.

The remaining contents are then cooled to ambient temperature in a heat exchanger 2 and transferred to a first intermediate tank 3 of for example 5 $m^3$, wherein the material to be further processed can be stored. In this way a clear solution is obtained, which comprises aluminium sulphate having a concentration of 8–8.5% $Al_2O_3$.

If an aluminium sulphate solution of intermediate quality is desired, this can be withdrawn from the first intermediate tank 3. This tank will hold an aluminium sulphate solution of about 8.5% aluminium as $Al_2O_3$. This solution can then be sold as an enriched aluminium sulphate solution.

However, if the concentration of iron and heavy metal ions still is to high for a commercial product, it is preferred that the aluminium sulphate solution is further purified by means of displacing crystals of aluminium sulphate from a solution supersaturated with the aluminium salt. This is accomplished in two crystallizers 4a,4b of for example 3 $m^3$, aluminium sulphate crystals being recycled from the first tank 4a to the second tank 4b.

The aluminium sulphate crystals are then transferred to a separator 5, from which they are removed by means of centrifugation/filtration according to standard techniques. In this way, a solid product is obtained which by means of the crystallization procedure has undergone a further purification step.

The mother liquor from the crystallization step is then transferred to a second intermediate tank 6 of for example 5 $m^3$, wherein the mother liquor can be stored before it is recycled to the reactor 1. This tank will hold about 25% sulphuric acid an aluminium sulphate solution of about 2.5% aluminium as $Al_2O_3$.

The mother liquor is supplied to the reactor 1 in such an amount that the aluminium salt solution therein comprises 10–30% free sulphuric acid, preferably 25% sulphuric acid. In this way the sulphuric acid is recycled in order to leach the raw material. The mother liquor can again be saturated with aluminium by the addition of more aluminium raw material, more sulphuric acid can also be added.

In a batch wise process five tons of an aluminium sulphate solution at a feed of 465 kg bauxite comprising 57% $Al_2O_3$ with 7% $Fe_2O_3$ as the main impurity can be reduced and crystallized according to the invention. The quantity of aluminium sulphate obtained as solid crystals will be 1,565 kg, which corresponds to 17% aluminium as $Al_2O_3$ and a yield of 67%.

EXAMPLE

Example 1

Solubility of Ferric Sulphate in Sulphuric Acid.

Experient 1

A solution was made by dissolving 63 g of ferric sulphate ennahydrate in 64 g of water at room temperature. Then 48 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 10.1 wt % $Fe_2O_3$ and 21.6 wt % $SO_3$, respectively. After at least 12 hours in room temperature, the slurry was filtered off, 89 g of crystal cake being separated from 86 g of filtrate.

The analysis of the crystal cake gave 14.3 wt % $Fe_2O_3$ and 20.1 wt % $SO_3$, and the analysis of the filtrate gave 6.0 wt % $Fe_2O_3$ and 23.3 wt % $SO_3$.

Experient 2

A solution was made by dissolving 42 g of ferric sulphate ennahydrate in 74 g of water at room temperature. Then 58 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 6.9 wt % $Fe_2O_3$ and 26.3 wt % $SO_3$, respectively. After at least 12 hours in room temperature, the slurry was filtered off, 107 g of crystal cake being separated from 68 g of filtrate.

The analysis of the crystal cake gave 9.2 wt % $Fe_2O_3$ and 24.7 wt % $SO_3$, and the analysis of the filtrate gave 3.3 wt % $Fe_2O_3$ and 28.9 wt % $SO_3$.

Experient 3

A solution was made by dissolving 19 g of ferric sulphate ennahydrate in 89 g of water at room temperature. Then 67 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 3.0 wt % $Fe_2O_3$ and 30.2 wt % $SO_3$, respectively. After at least 12 hours in room temperature, the slurry was filtered off, 34 g of crystal cake being separated from 141 g of filtrate.

The analysis of the crystal cake gave 8.4 wt % $Fe_2O_3$ and 24.7 wt % $SO_3$, and the analysis of the filtrate gave 1.7 wt % $Fe_2O_3$ and 31.5 wt % $SO_3$.

Experient 4

A solution was made by dissolving 62 g of ferric sulphate ennahydrate in 72 g of water at room temperature. Then 40 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 10.1 wt % $Fe_2O_3$ and 18.2 wt % $SO_3$, respectively. After at least 12 hours in room temperature, the slurry was filtered off, 27 g of crystal cake being separated from 148 g of filtrate.

The analysis of the crystal cake gave 17.6 wt % $Fe_2O_3$ and 16.0 wt % $SO_3$, and the analysis of the filtrate gave 8.7 wt % $Fe_2O_3$ and 18.6 wt % $SO_3$.

Experient 5

A solution was made by dissolving 54 g of ferric sulphate ennahydrate in 73 g of water at room temperature. Then 48 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 8.8 wt % $Fe_2O_3$ and 21.4 wt % $SO_3$, respectively. After at least 12 hours in room temperature, the slurry was filtered off, 53 g of crystal cake being separated from 122 g of filtrate.

The analysis of the crystal cake gave 13.2 wt % $Fe_2O_3$ and 19.5 wt % $SO_3$, and the analysis of the filtrate gave 6.9 wt % $Fe_2O_3$ and 22.2 wt % $SO_3$.

Experient 6

A solution was made by dissolving 41 g of ferric sulphate ennahydrate in 80 g of water at room temperature. Then 54 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 6.7 wt % $Fe_2O_3$ and 24.4 wt % $SO_3$, respectively. After at least 12 hours in room temperature, the slurry was filtered off, 50 g of crystal cake being separated from 125 g of filtrate.

The analysis of the crystal cake gave 11.1 wt % $Fe_2O_3$ and 21.7 wt % $SO_3$, and the analysis of the filtrate gave 4.9 wt % $Fe_2O_3$ and 25.5 wt % $SO_3$.

Experient 7

A solution was made by dissolving 29 g of ferric sulphate ennahydrate in 85 g of water at room temperature. Then 62 g of Concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 4.7 wt % $Fe_2O_3$ and 27.7 wt % $SO_3$, respectively. After at least 12 hours in room temperature, the slurry was filtered off, 35 g of crystal cake being separated from 140 g of filtrate.

The analysis of the crystal cake gave 10.0 wt % $Fe_2O_3$ and 24.6 wt % $SO_3$, and the analysis of the filtrate gave 3.3 wt % $Fe_2O_3$ and 28.5 wt % $SO_3$.

Experient 8

A solution was made by dissolving 18 g of ferric sulphate ennahydrate in 87 g of water at room temperature. Then 70 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 3.0 wt % $Fe_2O_3$ and 31.3 wt % $SO_3$, respectively. After at least 12 hours in room temperature, the slurry was filtered off, 29 g of crystal cake being separated from 146 g of filtrate.

The analysis of the crystal cake gave 9.9 wt % $Fe_2O_3$ and 26.5 wt % $SO_3$, and the analysis of the filtrate gave 1.6 wt % $Fe_2O_3$ and 32.3 wt % $SO_3$, Experient 9

A solution was made by dissolving 65 g of ferric sulphate ennahydrate in 68 g of water at room temperature. Then 41 g of concentrated sulphuric acid was slowly added with rapid mixing. When the temperature decreased, from almost boiling conditions, some light yellowish-white crystals were starting to form.

The purpose this example was to study the distribution of solid and liquid phase when the starting solution was prepared with target concentration of 10.6 wt %o $Fe_2O_3$ and 18.6 wt % $SO_3$, respectively. After at least 12 hours in room temperature, the slurry was filtered off, 85 g of crystal cake being separated from 90 g of filtrate.

The analysis of the crystal cake gave 14.0 wt % $Fe_2O_3$ and 17.4 wt % $SO_3$, and the analysis of the filtrate gave 7.4 wt % $Fe_2O_3$ and 19.7 wt % $SO_3$.

Experient 10

A solution was made by dissolving 37 g of ferric sulphate ennahydrate in 74 g of water at room temperature. Then 64 g of concentrated sulphuric acid was slowly added § with rapid mixing. When the temperature decreased, from almost boiling conditions, some light yellowish-white crystals were starting to form.

The purpose this example was to study the distribution of solid and liquid phase when the starting solution was prepared with target concentration of 6.0 wt % $Fe_2O_3$ and 28.6 wt % $SO_3$, respectively. After at least 12 hours in room temperature, the slurry was filtered off, 104 g of crystal cake being separated from 71 g of filtrate.

The analysis of the crystal cake gave 9.2 wt % $Fe_2O_3$ and 27.1 wt % $SO_3$, and the analysis of the filtrate gave 1.4 wt % $Fe_2O_3$ and 30.9 wt % $SO_3$.

Example 2

Purification of Aluminium Sulphate from an Aluminium Chloride Solution by Means of Displcaement Experiment 1

Concentrated sulphuric acid (8 g) was added to an aqueous solution of aluminium chloride (136 g). After standing, aluminium sulphate crystals precipitated from the oversaturated slurry obtained. The crystals were filtered off into a crystal cake (24 g), leaving d saturated solution of aluminium sulphate (120 g) as a mother liquor.

The compositions of the contents of the initial aluminium chloride solution, the crystal cake, and mother liquor, respectively, are shown in Table 1 below.

TABLE 1

| Contents | Aluminium chloride solution (136 g) | Aluminium sulphate crystal cake (24 g) | Saturated aluminium salt solution (120 g) |
| --- | --- | --- | --- |
| Al | 5.74% | 7.7% | 4.99% |
| Cr | 0.0101% | 0.0062% | 0.0102% |
| Fe(tot) | 0.0885% | 0.0421% | 0.0919% |
| Mn | 0.0800% | 0.0371% | 0.0833% |
| Co | 0.0013% | 0.0007% | 0.0013% |
| Ni | 0.0076% | 0.0043% | 0.0078% |
| Cu | 0.0143% | 0.0074% | 0.0147% |
| Zn | 0.0038% | 0.0019% | 0.0039% |
| $H_2SO_4$ | | 2.5% | 6.0% |

If it is assumed that the crystallized aluminium sulphate is not an acidic salt, such as like $Al_2(SO_4)_3 \cdot H_2SO_4 \cdot 8H_2O$, then all acid in the crystal cake should be derived from the aqueous material found around the crystals, since this aqueous material has the same composition as that in the saturated aluminium salt solution. The crystal cake can then be divided into a crystal part and an aqueous part.

The compositions of the contents of these two parts are shown in Table 2 below. Table 3 summarizes the crystal purification yield.

TABLE 2

| Contents | $Al_2(SO_4)_3 \cdot 12H_2O$ (14.0 g) | Aqueous material (10.0 g) |
| --- | --- | --- |
| Al | 9.65% | 4.99% |
| Cr | 0.0033% | 0.0102% |
| Fe(tot) | 0.0063% | 0.0919% |
| Mn | 0.0039% | 0.0833% |
| Co | 0.0003% | 0.0013% |
| Ni | 0.0018% | 0.0078% |
| Cu | 0.0022% | 0.0147% |
| Zn | 0.0005% | 0.0039% |
| $H_2SO_4$ | 0% | 5.98% |

TABLE 3

| | |
| --- | --- |
| Cr | 80% |
| Fe(tot) | 96% |
| Mn | 97% |
| Co | 88% |
| Ni | 86% |
| Cu | 91% |
| Zn | 93% |

Experiment 2

Concentrated sulphuric acid (8 g) was added to an aqueous solution of aluminium chloride (120 g). After standing, aluminium sulphate crystals precipitated from the oversaturated slurry obtained. The crystals were filtered off into a crystal cake (29 g), leaving a saturated solution of aluminium sulphate (97 g) as a mother liquor.

The compositions of the content of the initial aluminium chloride solution, the crystal cake, and mother liquor, respectively, are shown in Table 4 below.

TABLE 4

| Contents | Aluminium chloride solution (120 g) | Aluminium sulphate crystal cake (29 g) | Saturated aluminium salt solution (97 g) |
| --- | --- | --- | --- |
| Al | 4.99% | 7.7% | 3.84% |
| Cr | 0.0102% | 0.0059% | 0.0108% |
| Fe(tot) | 0.0919% | 0.0437% | 0.1004% |
| Mn | 0.0833% | 0.0378% | 0.0915% |
| Co | 0.0013% | 0.0007% | 0.0014% |
| Ni | 0.0078% | 0.0035% | 0.0085% |
| Cu | 0.0147% | 0.0071% | 0.0161% |
| Zn | 0.0039% | 0.0012% | 0.0045% |
| $H_2SO_4$ | 6.0% | 4.7% | 13.2% |

If it is assumed that the crystallized aluminium sulphate is not an acidic salt, such as like $Al_2(SO_4)_3 \cdot H_2SO_4 \cdot 8H_2O$, then all acid in the crystal cake should be derived from the aqueous material found around the crystals, since this aqueous material has the same composition as that in the saturated aluminium salt solution. The crystal cake can then be divided into a crystal part and an aqueous part.

The compositions of the contents of these two parts are shown in Table 5 below. Table 6 summarizes the crystal purification yield.

TABLE 5

| Contents | $Al_2(SO_4)_3 \cdot 11.5H_2O$ (18.7 g) | Aqueous material (10.3 g) |
| --- | --- | --- |
| Al | 9.83% | 3.84% |
| Cr | 0.0032% | 0.0108% |
| Fe(tot) | 0.0123% | 0.1004% |
| Mn | 0.0081% | 0.0915% |
| Co | 0.0003% | 0.0014% |
| Ni | 0.0007% | 0.0085% |
| Cu | 0.0021% | 0.0161% |
| Zn | −0.0006% | 0.0045% |
| $H_2SO_4$ | 0% | 13.20% |

TABLE 6

| | |
| --- | --- |
| Cr | 84% |
| Fe(tot) | 93% |
| Mn | 95% |
| Co | 88% |
| Ni | 95% |
| Cu | 93% |
| Zn | 108% |

Experiment 3

Concentrated sulphuric acid (17 g) was added to an aqueous solution of aluminium chloride (97 g). After standing, aluminium sulphate crystals precipitated from the over-saturated slurry obtained. The crystals were filtered off into a crystal take (31 g), leaving a saturated solution of aluminium sulphate (78 g) as a mother liquor.

The compositions of the contents of the initial aluminium chloride solution, the crystal cake, and mother liquor, respectively, are shown in Table 7 below.

TABLE 7

| Contents | Aluminium chloride solution (97 g) | Aluminium sulphate crystal cake (31 g) | Saturated aluminium salt solution (78 g) |
|---|---|---|---|
| Al | 3.84% | 5.7% | 2.70% |
| Cr | 0.0108% | 0.0059% | 0.0120% |
| Fe(tot) | 0.1004% | 0.0440% | 0.1155% |
| Mn | 0.0915% | 0.00380% | 0.1061% |
| Co | 0.0014% | 0.0007% | 0.0016% |
| Ni | 0.0085% | 0.0036% | 0.0099% |
| Cu | 0.0161% | 0.0071% | 0.0185% |
| Zn | 0.0045% | 0.0012% | 0.0055% |
| $H_2SO_4$ | 13.2% | 11.3% | 17.9% |

If it is assumed that the crystallized aluminium sulphate is not an acidic salt, such as like $Al_2(SO_4)_3\text{-}H_2SO_4\text{-}8H_2O$, then all acid in the crystal cake should be derived from the aqueous material found around the crystals, since this aqueous material has the same composition as that in the saturated aluminium salt solution. The crystal cake can then be divided into a crystal part and an aqueous part.

The compositions of the contents of these two parts are shown in Table 8 below. Table 9 summarizes the crystal purification yield.

TABLE 8

| Contents | $Al_2(SO_4)_3.H_2SO_4.x8H_2O$ (27.0 g) | Aqueous material (4.0 g) |
|---|---|---|
| Al | 6.14% | 2.70% |
| Cr | 0.0050% | 0.0120% |
| Fe(tot) | 0.0334% | 0.1155% |
| Mn | 0.0279% | 0.1061% |
| Co | 0.0006% | 0.0016% |
| Ni | 0.0027% | 0.0099% |
| Cu | 0.0054% | 0.0185% |
| Zn | 0.0006% | 0.0055% |
| $H_2SO_4$ | 10.32% | 17.93% |

TABLE 9

| | |
|---|---|
| Cr | 71% |
| Fe(tot) | 79% |
| Mn | 81% |
| Co | 75% |
| Ni | 80% |
| Cu | 79% |
| Zn | 92% |

Example 11
Separation of Aluminium Sulphate Crystals

A reactor was charged with 10 l of hydrochloric waste containing 70 g/l Al and 276 g/l Cl. Then 2.7 kg of sulphuric acid was added with stirring. This procedure resulted in a reaction mixture of 11.5 l, which had a $SO_4/Al$ ratio of 1.1.

After seeding with 700 g of aluminium sulphate crystals at room temperature a total of 5.8 kg of aluminium sulphate crystals was recovered, leaving 9.5 l of a mother liquor, which contained 26 g/l Al, 215 g/l $H_2SO_4$, and 219 g/l Cl.

What is claimed is:

1. A method of purifying a metal salt from inorganic impurities in an aqueous solution thereof, said metal salt being crystallized from said aqueous solution of said metal salt when supersaturated with the same and said inorganic impurities are dissolved therein, crystals of said metal salt subsequently being separated from said aqueous solution, wherein said aqueous solution is a non-saturated or saturated solution of said metal salt and is provided with an inorganic component, which is more easily soluble in said aqueous solution than said metal salt, said more easily soluble component being sulphuric acid, which inorganic component is added in such an amount that said aqueous solution becomes supersaturated with said metal salt, crystals of said metal salt as the more sparingly soluble component being displaced from said aqueous solution, wherein a first aqueous metal salt solution of a raw material containing impurities of salts of at least one more noble metal than the metal dissolved therein, is reduced adding metallic aluminium to said first aqueous aluminium salt solution, adding at least one chloride salt in order to activate said metallic aluminium, said at least one more noble metal salt being reduced to its metallic form; and separating said reduced at least one more noble metal from said first mixture, to form an aqueous metal salt solution, which forms the basis for the supersaturation step.

2. A method as in claim 1, wherein said aqueous solution is a saturated solution of said metal salt.

3. A method as in claim 1, wherein the sulphuric acid is a diluted sulphuric acid.

4. A method according to claim 1, wherein hydrochloric acid which has been displaced is recovered.

5. A method as in claim 1, wherein said metal salt is aluminium sulphate or aluminium chloride.

6. A method as in claim 1, wherein said raw material is an aluminium ore or an aluminium mineral.

7. A method as in claim 1, wherein said raw material is a polluted waste stream from the aluminium industry.

8. A method as in claim 6, wherein said chloride salt is added to said first metal salt solution to a final concentration of 17–18%.

9. A method as in claim 1, wherein said chloride salt is aluminium chloride.

10. A method as in claim 1, wherein said at least one more noble metal being reduced, is separated from said first mixture together with other solid waste materials by means of sedimentation and or filtration.

11. A method according to claim 1, wherein an excess of sulphuric acid amounting to about 20% is added to precipitate aluminium sulphate.

12. A method according to claim 1, wherein an excess of sulphuric acid amounting to about 30–35% is added to precipitate ferrisulphate monohydrate.

13. A method according to claim 1, wherein an excess of sulphuric acid amounting to above 40% is added to precipitate heavy metal sulphates.

14. A method as in claim 1, wherein said metal salt is an aluminium salt or a ferric salt.

15. A method as in claim 9, wherein an additive is added to said first mixture in order to facilitate said sedimentation.

16. A method as in claim 15, wherein said additive is a polymeric additive.

17. A method as in claim 16, wherein said polymeric additive is cationic polyacrylamide.

18. A method as in claim 15, wherein said additive is activated carbon.

19. A method as in claim 1, wherein the method further comprises the step of recycling said mother liquor by incorporating the same in said first aqueous aluminium salt solution.

20. A method as in claim 1, wherein said sulphuric acid has a concentration of at least 60%.

21. A method as in claim 19, wherein aluminium sulphate crystals are separated from said second mixture by means of filtration and/or centrifugation.

22. A method as in claim 19, wherein said mother liquor is incorporated in such an amount that said first aqueous aluminium salt solution comprises 10–30% free sulphuric acid.

* * * * *